United States Patent [19]

Kojima et al.

[11] Patent Number: 5,332,991
[45] Date of Patent: Jul. 26, 1994

[54] RESISTOR TYPE PHYSICAL QUANTITY SENSOR HAVING MIGRATION INHIBITING PATTERN

[75] Inventors: Takao Kojima, Aichi; Yoshiyuki Ohtake, Gifu; Satoshi Sugaya, Aichi, all of Japan

[73] Assignee: NGK Spark Plug Co., Ltd., Aichi, Japan

[21] Appl. No.: 980,409

[22] Filed: Nov. 20, 1992

[30] Foreign Application Priority Data

Nov. 22, 1991 [JP] Japan ................... 3-332959

[51] Int. Cl.$^5$ .............................................. H01C 3/04
[52] U.S. Cl. ..................... 338/25; 338/314; 338/306
[58] Field of Search ............. 338/22 R, 225 D, 25, 338/306, 314

[56] References Cited

U.S. PATENT DOCUMENTS 4,464,646  8/1984  Burger et al. .................... 338/25
4,649,364  3/1987  Tanahashi et al. ................ 338/14

FOREIGN PATENT DOCUMENTS 64-65427  3/1985  Japan .
WO89/03033  4/1989  World Int. Prop. O. .

OTHER PUBLICATIONS

Abstract of Japanese Patent Publication No. JP1208807; Published Aug. 22, 1989; Application No. JP880034253; Applicant: Matsushita Electric Ind Co. Ltd.
Abstract of Japanese Patent Publication No. JP63236934; Published Oct. 3, 1988; Application No. JP870070207; Applicant: Yamatake Honeywell Co., Ltd.
European Search Report No. EP 92 11 9833 dated Feb. 3, 1993.

Primary Examiner—Marvin M. Lateef
Attorney, Agent, or Firm—Fish & Richardson

[57] ABSTRACT

A physical quantity sensor e.g., temperature sensor having a resistor pattern and a ceramic support carrying the resistor pattern. The resistor pattern has an ionizing component retention conductor pattern which is branched at its negative terminal side.

The resistor pattern with branched pattern are stacked between the ceramic support layers.

Migration in the resistor pattern is suppressed to prevent the resistance of the resistor pattern from being increased for assuring accurate measurement of temperature. The sensor is operated without cooling to 0° C.

13 Claims, 5 Drawing Sheets

RESISTOR TYPE PHYSICAL QUANTITY SENSOR HAVING MIGRATION INHIBITING PATTERN

DESCRIPTION

1. Field of the Invention

This invention relates to a physical quantity sensor, such as a temperature sensor, level sensor or an air flow sensor, for sensing a physical quantity by utilizing changes with temperature of the resistance of metals employed in the sensor.

2. Background

Thermocouple temperature sensors have been known as a physical quantity sensor for sensing the temperature by taking advantage of a thermo-electromotive force.

Temperature sensors, level sensors, air flow sensors etc. have been known as physical quantity sensors employing changes in resistance with temperature of metals. For example, the temperature sensor is employed in a circuit shown in FIG. 12. Since the resistance of the temperature sensor is changed with temperature, it is possible to measure the temperature from the changes in the resistance. The changes in resistance of the temperature sensor are detected by a voltmeter 120 connected in parallel with the temperature sensor.

PROBLEM TO BE SOLVED BY THE INVENTION

In the physical quantity sensor taking advantage of the thermo-electromotive force of, e.g., a thermocouple temperature sensor, it is usually necessary to maintain the temperature of one of two contacts of different metals generating the thermo-electromotive force at 0° C. Consequently, it becomes necessary to provide a zero degree compensation circuit in case of a car-laden temperature sensor, thus resulting in increased production costs.

Figure 12:
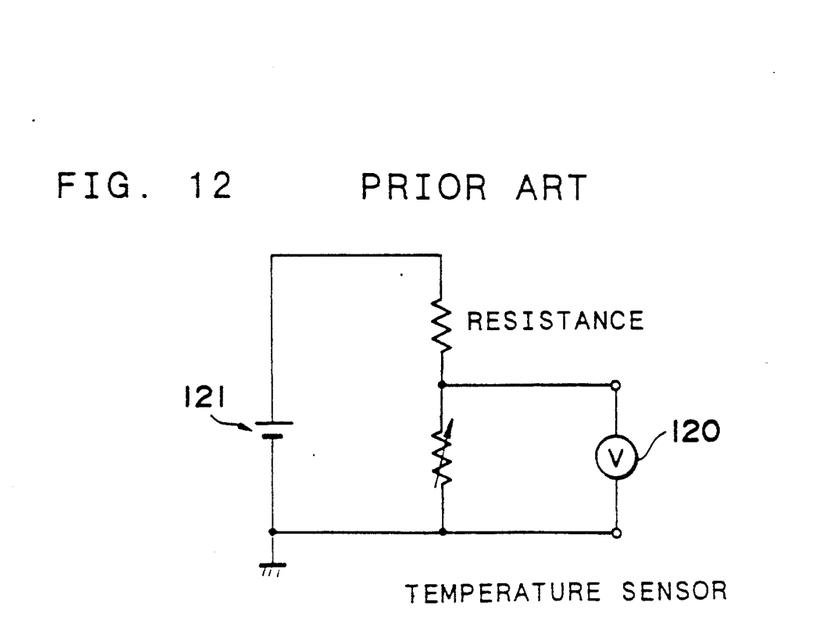
FIG. 12 is a circuit diagram showing a circuit employing a temperature sensor.

In a temperature sensor employing changes in resistance of metals with temperature, in which high accuracy is required as in the case of a car-laden temperature sensor, it is usually necessary for the temperature sensor to fulfill the following conditions or premises:

(i) That the sensor itself is not heated by current conduction, that is that the resistor has a high resistance value;

(ii) That the potential difference may be measured with high accuracy; to this end, a smaller value of a serial resistor is desirable if the sensor is used in the circuit shown in e.g. FIG. 12;

(iii) The source voltage is 5 to 8 V in consideration that the temperature sensor is laden on a car.

By reason of these requirements, a potential difference of 1 to 3 V is usually produced in the physical quantity sensor, with the power consumption being on an order of 0.01 watt.

Meanwhile, in most of conventional temperature sensors, thin films of a precious metal, mainly platinum, are used. These thin films, however, can not be used at elevated temperatures of 600° C. or higher. On the other hand, a temperature sensor of the type including a stack of thicker films of precious metal, has been proposed in JP Patent KOKAI Publication No. 64-65427 (1989). However, this type of the temperature sensor has been found to be unsatisfactory if the temperature exceeding 800° C., especially a temperature exceeding 900° C., is to be measured with high accuracy.

SUMMARY OF THE DISCLOSURE

It is an object of the present invention to provide a physical quantity sensor free of the above-mentioned difficulties.

According to the present invention, there is provided a physical quantity sensor comprising a resistor pattern having its resistance changed with temperature and a ceramic support for supporting said resistor pattern, said resistor pattern having an ionizing component retention conductor pattern which is branched at a negative terminal side thereof.

Preferably, the ceramic support supporting the resistor pattern is composed of two or more ceramic layers wherein the resistor pattern is supported between these ceramic layers. As a result, it becomes possible to increase the resistance of the physical quantity sensor in its entirety to diminish heat evolution.

Preferably, the ionizing component retention conductor pattern is branched between the two ceramic layers at the most negative side of the resistor pattern.

Preferably, the thickness of the two ceramic layers supporting the ionizing component retention conductor pattern therebetween is thinner than the thickness of the remaining ceramic layers. In this manner, migration tends to be produced more readily with the conductor sandwiched between these two layers. That is, if a resistor pattern is provided between and connected to these two layers, the lesser the thickness of the ceramic layers, the more the migration is likely to be produced. Consequently, by reducing the thickness of the two layers lying on both sides of the ionizing component retention conductor pattern as compared to that of the remaining layer(s), the migration may be rendered more likely to be produced in the ionizing component retention conductor pattern. The result is that the migration is rendered less likely to be produced in the resistor pattern.

The basic concept of the present invention is discussed hereinbelow.

The conventional physical sensor, such as a temperature sensor, was not fully satisfactory in measuring the temperature accurately, as explained in the foregoing. The present inventors have conducted eager research toward finding the reason and have arrived at the following information.

(i) Even although the potential difference of the sensor is 1 to 3 V and the power consumption is on an order of 0.01 watt, the migration tends to be produced depending on the temperature used, as a result of which the resistance value after use of the sensor is increased, and consequently the temperature cannot be measured accurately.

(ii) The migration here means a phenomenon in which MgO or CaO contained in the ceramic support as sintering aids are converted into and migrated in the form of ions such as $Mg^{2+}$ or $Ca^{2+}$. The migration is likely to be produced if MgO and CaO are contained in amounts of 0.5 wt % or more.

Although the migration has been known to be produced in a ceramic heater in which the applied voltage is 8 V or higher and the power consumption is on an order of 10 watt, the present inventors are the first to have discovered that the phenomenon is similarly produced in the case of the physical quantity sensor in which the applied voltage and the power are markedly lower than the case of the ceramic heater.

Based on the above information, the present inventors have found that, by providing the ionizing component retention conductor pattern as a branch from the negative terminal side of the resistor pattern, it becomes possible to prevent the migration from being produced in the resistor pattern and consequently to measure the temperature accurately. This finding has led the present inventors to completion of the present invention.

That is, since the ionizing component retention conductor pattern is provided as a branch from the negative terminal side of the resistor pattern, the migration of ions such as $Mg^{2+}$, $Ca^{2+}$ etc. due to current conduction is produced in the ionizing component retention conductor pattern but is not produced in the resistor pattern, so that the resistance of the resistor pattern is prevented from being increased to render it possible to measure the temperature accurately.

EFFECT OF THE INVENTION

Since the physical quantity sensor of the present invention is comprised of the resistor pattern having its resistance changed with temperatures, and the ceramic support supporting the resistor pattern, which resistor pattern has the ionizing component retention conductor pattern branched at the negative terminal side, it becomes possible to prevent migration in the resistor pattern. Consequently, it becomes possible to prevent the resistance from being increased and hence to measure the temperature accurately.

Since it is not mandatory with the physical quantity sensor of the present invention to use a device for maintaining the temperature of 0° C., as in the case of the physical quantity sensor utilizing the thermo-electromotive force, it may be produced at lower costs even if the temperature is to be measured on a vehicle, in distinction from the thermocouple type temperture sensor.

The present invention will be disclosed in more detail with reference to the Drawings for better illustration.

PREFERRED EMBODIMENTS

A resistor pattern has its resistance changed with temperatures, and may composed of a main ingredient of metals exhibiting thermal resistivity in a range of temperatures to be measured. For example, it may be composed of a main ingredient of one or more of high melting metal(s), admixed with ceramics as an auxiliary component. Since the resistance of the resistor pattern may be adjusted by addition of ceramics, the composition and/or the quantity of the ceramics are suitably set for achieving a desired resistance value.

Examples of the high melting metals include platinum, rhodium, molybdenum, tungsten, tantalum or the like.

The ceramics which are of the same type as those used for a ceramic support to be now described may be employed.

The ceramic support is an insulator supporting the resistor pattern and any suitable ceramic support capable of supporting the resistor pattern in the range of temperatures to be measured suffices. For example, alumina, mullite, cordierite, forsterite, beryllia, silicon nitride or the like may be employed. The ceramic support containing not less than 85% of $\alpha$-$Al_2O_3$ is preferred.

The ceramic support may also be a composite material of ceramics and a conductor, preferably a thermally resistant conductor, if it is capable of maintaining insulation with respect to the resistor pattern.

The ceramic support may be in the form of a plate, stacked layers, a cylinder, a cone, a sphere, a hollow sphere or a combination of these shapes. The ceramic support may also include a protective member for protecting the resistor pattern or an ionizing component retention conductor pattern. The protective member may be detachable.

The ionizing component retention conductor pattern is branched at a negative terminal side of the resistor pattern and has a potential not higher than the potential of the negative terminal of the resistor pattern, so that abnormal heating is not produced even though the migration is produced. The ionizing component retention conductor pattern may be formed of the same material as that of the resistor pattern.

The ionizing component retention conductor pattern may be in the form of a straight line, branched configuration, circle, S-shaped curve, U-shaped curve, or a combination of these shapes.

The ionizing component retention conductor pattern needs only to be branched at the side of the negative terminal of the resistor pattern. For example, if the resistor pattern is to be formed on one of the surfaces of the ceramic substrate, the ionizing component retention conductor pattern may be branched on the substrate surface from the negative terminal side of the resistor pattern. If two or more ceramic substrates are stacked together with the resistor pattern supported in-between, the ionizing component retention conductor pattern may be supported between the layers, together with or alone separately from the resistor pattern. (It is noted that, if there are two or more interlayer zones, the resistor patterns in these interlayer zones are electrically connected with one another by through-holes.)

It is desirable to increase the resistance value of the resistor pattern of the physical quantity sensor for inhibiting heat evolution otherwise caused by current conduction. To this end, addition of the ceramics to the resistor pattern as described above is effective. However, if the ceramics are added in an excessive amount, it becomes difficult to maintain stable current conduction. Consequently, it is preferred to stack two or more of the ceramic substrates having resistor patterns for electrically connecting these resistors in series for increasing the resistance of the physical quantity sensor.

It suffices if the ionizing component retention conductor pattern is branched at least at one site at the negative terminal side of the resistor pattern. One or more of the ionizing component retention conductor patterns may also be provided and branched from an arbitrary position of the resistor pattern. For example, if branching is made at the positive terminal side of the resistor, it becomes possible to prevent, e.g., platinum, of which if any resistor pattern is made, from being scattered at the positive terminal side when the temperature is raised to a higher value (1000° C. or higher).

For facility in interconnection, it is possible for the ionizing component retention conductor pattern and the resistor pattern to have a lead section having a cross-sectional area larger than that of the remaining section.

EXAMPLES

Examples 1 to 10

A temperature sensor, as an example of the resistor type physical quantity sensor provided with a migration-inhibiting pattern, was produced by the following process.

Step 1: A composition comprising 92 wt % of $Al_2O_3$ and 3 wt % of MgO, with the balance being CaO, $SiO_2$ etc. was admixed with milling balls mainly formed of $Al_2O_3$ and a solvent such as toluene, and mixed for 50 hours.

Step 2: The mixture obtained in step 1 was admixed with an organic resin, such as BMS, and mixed further for 10 hours.

Step 3: Three kinds of sheets, having green thicknesses of 0.25, 0.4 and 0.55 mm, were produced by a doctor blade method.

Step 4: The three kinds of sheets produced by step 3 were dried at 200° C. for two hours and cut to a predetermined size (60×90 mm).

Step 5: Pt was paste-printed by a screen printing method to a thickness of 25 μm on three kinds of sheets, having green thicknesses of 0.25, 0.4 and 0.55 mm, produced by step 4, for forming a resistor pattern and its lead section, respectively.

Figure 1:
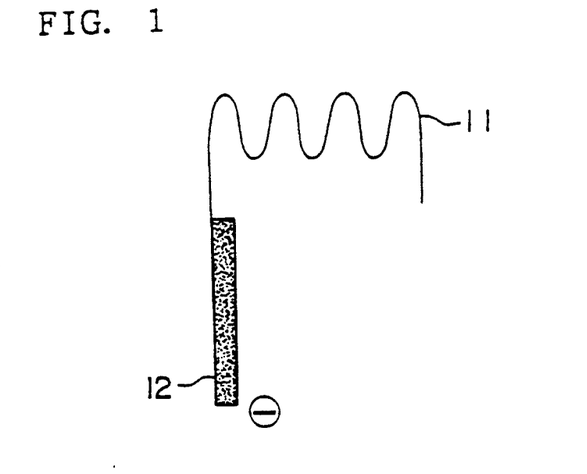
FIG. 1 is a plan view showing an embodiment of an ionizing component retention conductor pattern according to the present invention.
Figure 2:
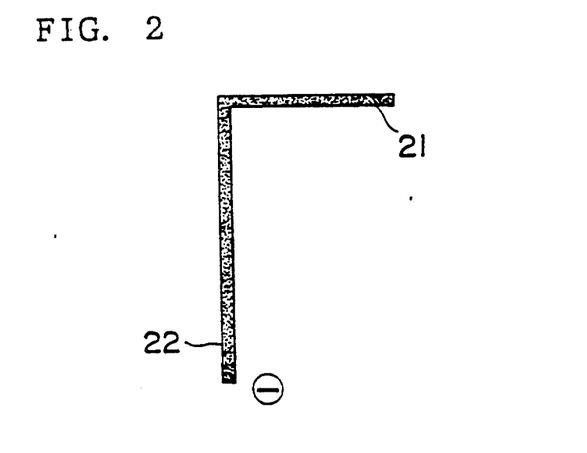
FIG. 2 is a plan view showing another embodiment of an ionizing component retention conductor pattern according to the present invention.
Figure 3:
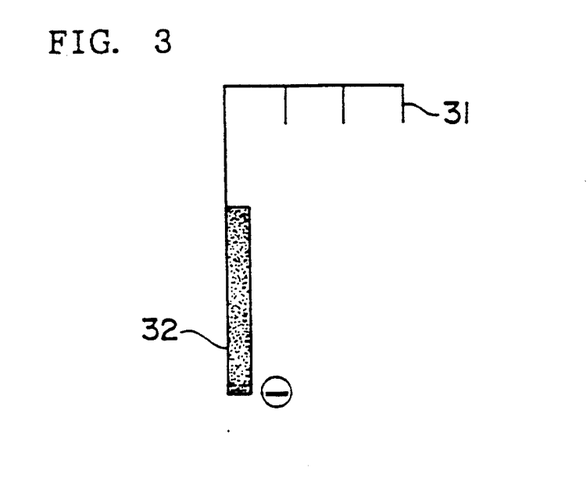
FIG. 3 is a plan view showing another embodiment of an ionizing component retention conductor pattern according to the present invention.

Step 6: Pt was paste-printed by a screen printing method to a thickness of 20 μm on the two kinds of sheets, having green thicknesses of 0.25 and 0.4 mm, produced by step 4, for forming an ionizing component retention conductor pattern having a lead section. FIGS. 1 to 3 show the so-formed ionizing component retention conductor patterns 11, 21, 31 with respective lead sections 12, 22, 32, these lead sections being connected to the negative terminal of the resistor pattern.

As for the remaining sheets, an ionizing component retention conductor pattern was arranged along the resistor pattern of step 5.

Figure 4:
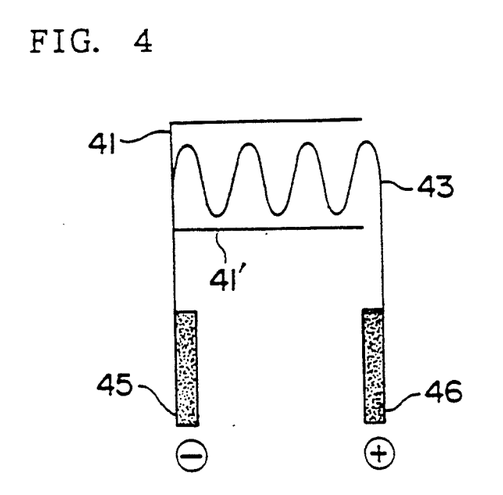
FIG. 4 is a plan view showing an embodiment of a resistor pattern having an ionizing component retention conductor pattern according to the present invention.
Figure 5:
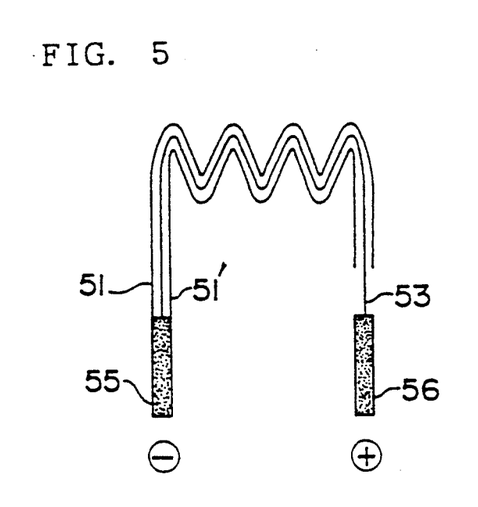
FIG. 5 is a plan view showing another embodiment of a resistor pattern having an ionizing component retention conductor pattern according to the present invention.

FIGS. 4 and 5 show ionizing component retention conductor patterns 41, 41'; 51, 51', resistor patterns 43, 53, lead sections 45, 55 connected to the negative terminal and leads 46, 56 connected to the positive terminal.

Step 7: A through-hole 0.5 mm in diameter was bored at a predetermined site (the lowermost position of the lead section) of each sheet and filled with a liquid Pt using a needle, brush or the like for forming a contact for electrical connection with the lead section of a neighboring layer at the time of stacking.

Step 8: A slurry obtained in step 1 was sampled and admixed with a suitable amount of butyl carbidol to form a paste.

Figure 6:
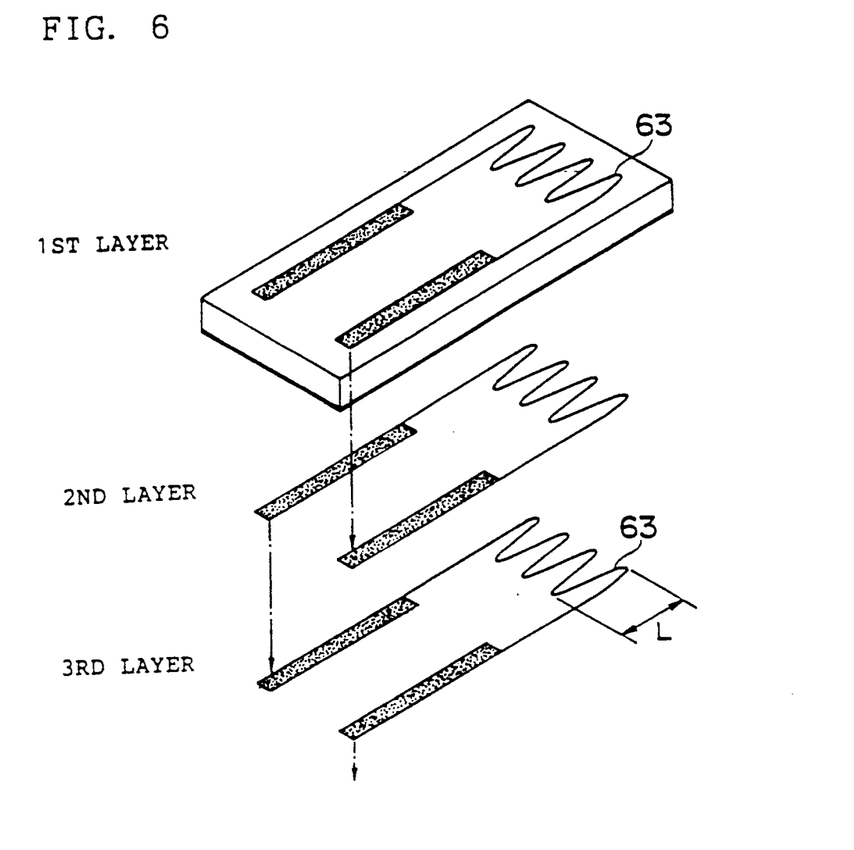
FIG. 6 is an exploded view for illustrating a production process of producing an embodiment of a physical quantity sensor according to the present invention.
Figure 7:
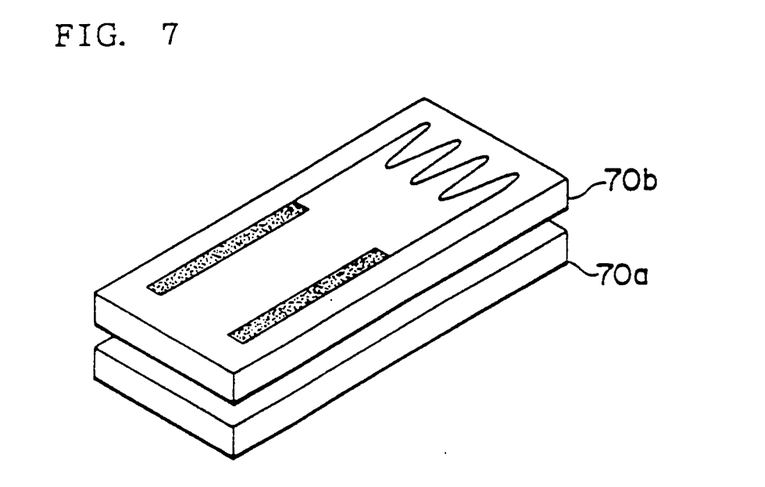
FIG. 7 is another exploded view for illustrating a production process of producing an embodiment of a physical quantity sensor according to the present invention.
Figure 11:
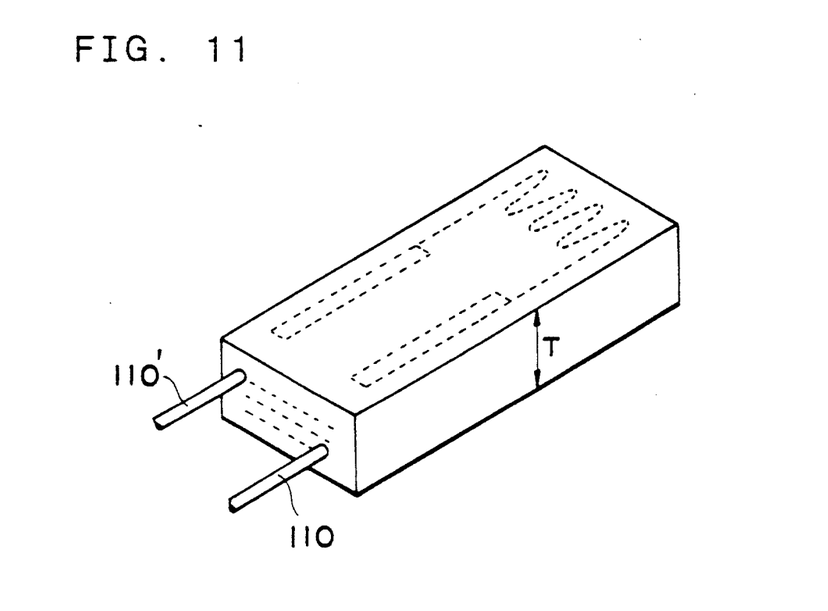
FIG. 11 is a perspective view showing an embodiment of a stacked body obtained at step 9 according to an embodiment of the present invention.

Step 9: A paste comprising castor oil etc. was screen-printed on a surface of the sheet obtained in steps 5 and 6 opposite to its pattern-printed surface, to a thickness of about 10 μm, and predetermined stacking as indicated in Table 1 below was carried out so that the contact formed in step 7 was connected to the lead section of the neighboring layer at the time of stacking. This process step is shown in FIGS. 6 and 7. Meanwhile, sheets of the second and third layers, the fourth layers ff in FIG. 6 and a layer stacked on a resistor pattern stacked on a layer 70b shown in FIG. 7 are not shown. The size L of the resistor pattern 63 shown in FIG. 6 was set to 10 mm. At this time, platinum wires 0.4 mm in diameter were arrayed on a lead take-out part and affixed thereto under heat and pressure application to produce a stacked body. FIG. 11 shows an example of the stacked body. The stacked body had a size of 60 mm×4 mm×T. The thickness T of the stacked body was 2 to 3 mm depending on the number of stacked layers. Platinum wires 110, 110' were respectively connected to the lead sections.

Meanwhile, sheets 70a, 70b on both sides of the ionizing component retention conductor pattern shown in FIG. 7 were set so as to be equal in thickness to each other. The ionizing component retention conductor pattern, not shown, was formed on the sheet 70a.

Step 10: The paste produced in step 8 was screen-printed to a thickness of approximately 50 μm on an upper most layer exposing the resistor pattern to form a coated layer.

Figure 8:
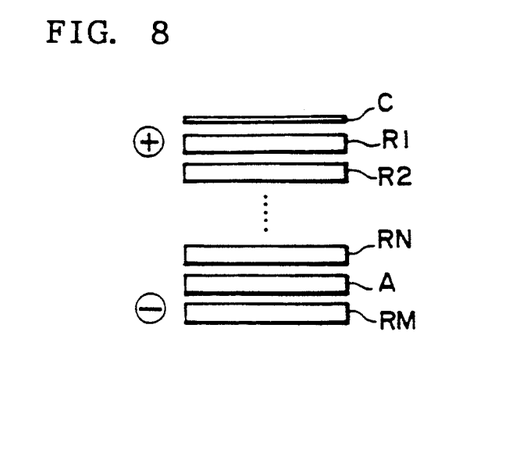
FIG. 8 is an exploded view showing the production process of producing an embodiment of a physical quantity sensor according to the present invention, in which the sensor is shown divided from layer to layer and in which the lower end of the figure is to be connected to a negative terminal.
Figure 9:
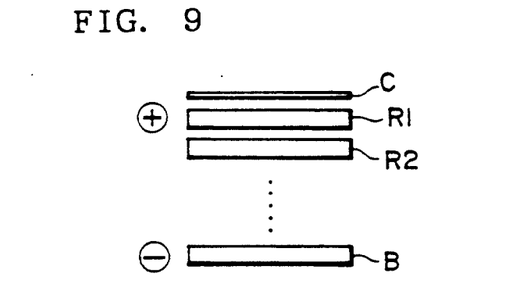
FIG. 9 is an exploded view showing the production process of producing another embodiment of a physical quantity sensor according to the present invention, in which the sensor is shown divided from layer to layer and in which the lower end of the figure is to be connected to a negative terminal.
Figure 10:
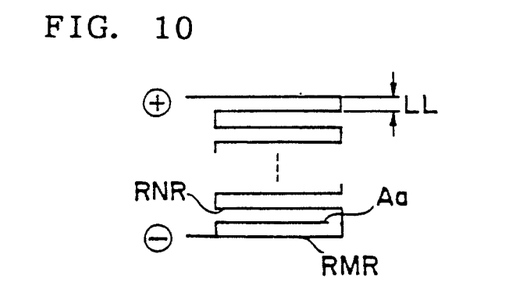
FIG. 10 is a diagrammatic view showing the manner of connection between an ionizing component retention conductor pattern and a resistor pattern of an embodiment of a physical quantity sensor according to the present invention, in which a ceramic support is not shown and in which the lower end of the figure is to be connected to a negative terminal.

An example of a layer structure in which a conductor pattern was separately provided and in which a sheet A having only the ionizing component retention conductor pattern and sheets having only resistor pattern (R1, R2, . . . RN, RM) were combined to from a temperature sensor is shown in FIG. 8, in which the sheet RN and the sheet A are shown to be of the same thickness. On the other hand, an example of a layer structure in which a conductor pattern was integrally provided and in which a sheet B having both the ionizing component retention conductor pattern and the resistor pattern and sheets having only resistor pattern (R1, R2, ...) were combined to form a temperature sensor is shown in FIG. 9. In FIGS. 8 and 9, C denotes a coating layer. The connection of the ionizing component retention conductor pattern Aa and resistor patterns (RNR, RMR) in the example of the separate conductor pattern type is shown in FIG. 10, in which ceramic support is not shown and a size LL indicates a sheet thickness.

Step 11: After resin removal at 250° C. for six hours, sintering was carried out at 1550° C. for four hours in atmosphere.

Step 12: An Ni wire 1.0 mm in diameter was connected to a platinum wire by resistance welding etc. to produce ten different kinds of resistor type temperature sensors (Examples 1 to 10).

Durability Test

Each temperature sensor of Examples 1 to 10 was held at 900° C. for 200 hours. The voltage applied to the temperature sensor was maintained at 3 V.

For maintaining the voltage of the temperature sensor at 3 V, the temperature sensors of the Examples 1 to 10 were connected in series to resistors of 600 ohms, both ends of which were connected to a d.c. power source 121. The voltage of the d.c. power source was adjusted within a range of about 6 V so that the voltage of 3 V could be continuously applied to the temperature sensor.

The results of the durability test are shown in Table 1. The results of the durability tests for the temperature sensors not provided with the ionizing component retention conductor pattern (Comparative Examples 1 and 2) and those for the temperature sensors provided with the ionizing component retention conductor pattern which however was not provided on the same layer as the lower most layer of the resistor patterns (on the negative terminal side) or between the lower most layer and the next layer, but which was provided between the third and fourth layers from the bottom (Reference Example) are also shown in Table 1.

It is seen from Table 1 that the temperature sensor of the present invention is extremely low in a resistance increase ratio after the durability test. Consequently, it is possible with the temperature sensor of the present invention to measure the temperature with high accuracy up to an elevated temperature.

It should be noted that further objects will become apparent in the entire disclosure of the present application. Also it should be noted that modifications obvious in the art may be done from the embodiments without departing from the gist and scope as herein disclosed and claimed as appended.

We claim:

1. A physical quantity sensor comprising a resistor pattern having its resistance changed with temperature and a ceramic support for supporting said resistor pattern, said resistor pattern having a branched conductor pattern for retaining ionizing components which is branched at a negative terminal side thereof.

2. The physical quantity sensor as defined in claim 1 wherein said ceramic support supporting said resistor pattern is composed of two or more ceramic layers and wherein said resistor pattern is supported between said ceramic layers.

3. The physical quantity sensor as defined in claim 2 wherein said branched conductor pattern for retaining ionizing components is branched between the two ceramic layers at the most negative side of the resistor pattern.

4. The physical quantity sensor as defined in claim 3 wherein the two ceramic layers supporting said branched conductor pattern for retaining ionizing components therebetween are thinner in thickness than any remaining ceramic layers.

5. The physical quantity sensor as defined in claim 4 wherein said branched conductor pattern for retaining ionizing components extends substantially along the resistor pattern.

6. The physical quantity sensor as defined in claim 5 wherein said branched conductor pattern for retaining

TABLE 1

| | mm of layer having resistor pattern printed thereon | Sheet layer having ionizing component retention conductor patter printed thereon | | Initial resistance ($\Omega$) | Number of stacked layers having resistor patterns printed thereon | Resistance after durability | Resistance increase ($\Omega$) | Resistance increase ratio (%) | Evaluation |
|---|---|---|---|---|---|---|---|---|---|
| | | Thickness mm | Pattern shape | | | | | | |
| Ex. | | | | | | | | | |
| 1 | 0.4 | 0.25 | FIG. 1 | 170 | 6 | 172 | 2 | 1.2 | ⊚ |
| 2 | | | FIG. 2 | 172 | | 173 | 1 | 0.6 | ⊚ |
| 3 | | | FIG. 3 | 168 | | 171 | 3 | 1.8 | ⊚ |
| 4 | | 0.4 | FIG. 1 | 165 | | 169 | 4 | 2.4 | ○ |
| 5 | | | FIG. 2 | 161 | | 166 | 5 | 3.1 | ○ |
| 6 | 0.55 | 0.25 | FIG. 1 | 141 | 5 | 142 | 1 | 0.7 | ⊚ |
| 7 | | 0.4 | | 139 | | 141 | 2 | 1.4 | ○ |
| 8 | 0.25 | 0.25 | | 219 | 8 | 225 | 6 | 2.7 | ○ |
| 9 | 0.4 | 0.4 | FIG. 4 | 167 | 6 | 174 | 7 | 4.2 | ○ |
| 10 | | | FIG. 5 | 165 | | 170 | 5 | 3.0 | ○ |
| Comp. Ex. | | | | | | | | | |
| 1 | 0.55 | — | — | 171 | | 197 | 26 | 15.2 | X |
| 2 | 0.25 | — | — | 169 | | 208 | 39 | 23.1 | X |
| Ref. Ex. | 0.4 | 0.25 | FIG. 1 | 166 | | 191 | 25 | 15.1 | X |

Remarks: initial resistance and resistance after durability are mean values of three measurements
⊚ resistance increase ratio of 2% or less
○ resistance increase ratio of 5% or less
X resistance increase ratio of more than 5% ionizing components extends substantially parallel to the resistor pattern.

7. The physical quantity sensor as defined in claim 5 wherein said branched conductor pattern for retaining ionizing components is provided on the both sides of the resistor pattern.

8. The physical quantity sensor as defined in claim 3 wherein at least a further branched conductor pattern for retaining ionizing components is branched at any position of the resistor pattern.

9. The physical quantity sensor as defined in claim 8 wherein said at least a further branched conductor pattern for retaining ionizing components is branched at the positive terminal side of the resistor pattern.

10. The physical quantity sensor as defined in any one of claims 1-9 wherein the branched conductor pattern for retaining ionizing components comprises at least one disposed on the same interlayer-zone as the resistor pattern.

11. The physical quantity sensor as defined in claim 1, 3 or 6 wherein the branched conductor pattern for retaining ionizing components comprises at least one disposed on an opposite side of a ceramic support to an associated resistor pattern from which the branched conductor pattern for retaining ionizing components is branched.

12. The physical quantity sensor as defined in claim 10 wherein the branched conductor pattern for retaining ionizing components comprises at least one disposed on an opposite side of a ceramic support to an associated resistor pattern from which the branched conductor pattern for retaining ionizing components is branched.

13. The physical quantity sensor as defined in claim 1, 3 or 6 wherein the sensor is a temperature sensor.

* * * * *